US006845358B2

(12) United States Patent
Kibre et al.

(10) Patent No.: US 6,845,358 B2
(45) Date of Patent: Jan. 18, 2005

(54) PROSODY TEMPLATE MATCHING FOR TEXT-TO-SPEECH SYSTEMS

(75) Inventors: Nicholas Kibre, Mountain View, CA (US); Ted H. Applebaum, Santa Barbara, CA (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 439 days.

(21) Appl. No.: 09/755,699

(22) Filed: Jan. 5, 2001

(65) Prior Publication Data

US 2002/0128841 A1 Sep. 12, 2002

(51) Int. Cl.[7] ........................ G10L 13/08; G10L 13/06; G06F 17/21

(52) U.S. Cl. ......................... 704/260; 704/266; 704/10

(58) Field of Search ................................ 704/260, 258, 704/257, 254, 246, 10

(56) References Cited

U.S. PATENT DOCUMENTS 5,384,893 A * 1/1995 Hutchins .................... 704/260
5,625,749 A * 4/1997 Goldenthal et al. ......... 704/254
5,652,828 A * 7/1997 Silverman ................... 704/260
5,890,117 A 3/1999 Silverman
5,905,972 A 5/1999 Huang et al.
5,915,237 A * 6/1999 Boss et al. .................. 704/260
6,029,132 A * 2/2000 Kuhn et al. ................. 704/260
6,052,664 A 4/2000 Van Coile et al.
6,055,498 A * 4/2000 Neumeyer et al. .......... 704/246
6,101,470 A * 8/2000 Eide et al. .................. 704/260
6,163,769 A * 12/2000 Acero et al. ................ 704/260
6,185,533 B1 * 2/2001 Holm et al. ................ 704/258
6,260,016 B1 * 7/2001 Holm et al. ................ 704/260
6,266,637 B1 * 7/2001 Donovan et al. ........... 704/258
6,438,522 B1 * 8/2002 Minowa et al. ............. 704/258
6,490,563 B2 * 12/2002 Hon et al. .................. 704/260
2001/0018654 A1 * 8/2001 Hon et al. .................. 704/257
2001/0044724 A1 * 11/2001 Hon et al. .................. 704/260

FOREIGN PATENT DOCUMENTS

EP 0833304 A2 4/1998
EP 0953970 A2 11/1999
JP 07-311588 * 11/1995 ............. G10L/3/00
JP 8-044391 * 2/1996 ............. G10L/3/00
JP 08-263260 * 10/1996 ............. G10L/3/00
JP 10-171485 * 6/1998 ............. G10L/3/00
JP 2000-310995 * 11/2000 ........... G10L/13/06

OTHER PUBLICATIONS

Iverson et al ("An Experiment Of Surface Recognition By Neural Trees", Computer Architectures for Machine Perception proceedings, Sep. 1995).*

Lee et al ("Voice Response Systems", ACM Computing Surveys (CSUR), Dec. 1983).*

Levine ("Prosodic Generation Research", Proceedings of the Annual Conference, Oct. 1976).*

(List continued on next page.)

*Primary Examiner*—Doris H. To
*Assistant Examiner*—Daniel A Nolan
(74) *Attorney, Agent, or Firm*—Harness, Dickey & Pierce, PLC

(57) ABSTRACT

A prosody matching template in the form of a tree structure stores indices which point to lookup table and template information prescribing pitch and duration values that are used to add inflection to the output of a text-to-speech synthesizer. The lookup module employs a search algorithm that explores each branch of the tree, assigning penalty scores based on whether the syllable represented by a node of the tree does or does not match the corresponding syllable of the target word. The path with the lowest penalty score is selected as the index into the prosody template table. The system will add nodes by cloning existing nodes in cases where it is not possible to find a one-to-one match between the number of syllables in the target word and the number of nodes in the tree.

22 Claims, 6 Drawing Sheets

OTHER PUBLICATIONS

Chung–Hsien et al ("Template–Driven Generation Of Prosodic Information For Chinese Concatenative Synthesis", IEEE International Conference on Acoustics, Speech, and Signal Processing, Mar. 1999).*

Huang et al ("Recent Improvements On Microsoft's Trainable Text–To–Speech System—Whistler", IEEE International Conference on Acoustics, Speech, and Signal Processing, Apr. 1997).*

Chung–Hsien Wu, Jau–Hung Chen, "Template–Driven Generation of Prosodic Information for chinese Concatenative Synthesis", 1999 IEEE International Conference on Acoustics, Speech, adn Signal Processing. Phoenix, AZ, Mar. 15–19, 1999, IEEE Internation Conference on Acoustics, Speech, and signal Processign (ICASSP), New York, NY.

* cited by examiner

| Stress-Pattern | Word | Transcription | | | | |
|---|---|---|---|---|---|---|
| 2010 | Catalina | ca-2 | ta-0 | li-1 | na-0 | |
| 02010 | Atascadero | a-0 | tas-2 | ca-0 | de-1 | ro-0 |
| 20010 | Santa Clarita | san-2 | ta-0 | cla-0 | ri-1 | ta-0 |
| 102 | Avenue | a-1 | ve-0 | nue-2 | | |

PROSODY TEMPLATE MATCHING FOR TEXT-TO-SPEECH SYSTEMS

BACKGROUND AND SUMMARY OF THE INVENTION

The present invention relates generally to text-to-speech synthesis. More particularly, the invention relates to a technique for applying prosody information to the synthesized speech using prosody templates, based on a tree-structured look-up technique.

Text-to-speech systems convert character-based text (e.g., typewritten text) into synthesized spoken audio content. Text-to-speech systems are used in a variety of commercial applications and consumer products, including telephone and voicemail prompting systems, vehicular navigation systems, automated radio broadcast systems, and the like.

There are a number of different techniques for generating speech from supplied input text. Some systems use a model-based approach in which the resonant properties of the human vocal tract and the pulse-like waveform of the human glottis are modeled, parameterized, and then used to simulate the sounds of natural human speech. Other systems use short digitally recorded samples of actual human speech that are then carefully selected and concatenated to produce spoken words and phrases when the concatenated strings are played back.

To a greater or lesser degree, all of the current synthesis techniques sound unnatural unless prosody information is added. Prosody refers to the rhythmic and intonational aspects of a spoken language. When a human speaker utters a phrase or sentence, the speaker will usually, and quite naturally, place accents on certain words or phrases, to emphasize what is meant by the utterance. A text-to-speech apparatus can have great difficulty simulating the natural flow and inflection of the human-spoken phrase or sentence because the proper inflection cannot always be inferred from the text alone.

For example, in providing instructions to a motorist to turn at the next intersection, the human speaker might say "turn HERE," emphasizing the word "here" to convey a sense of urgency. The text-to-speech apparatus, simply producing synthesized speech in response to the typewritten input text, would not know whether a sense of urgency was warranted, or not. Thus the apparatus would not place special emphasis on one word over the other. In comparison to the human speech, the synthesized speech would tend to sound more monotone and monotonous.

In an effort to inject more realism into synthesized speech, it is now possible to provide the text-to-speech synthesizer with additional prosody information, which is used to alter the way the synthesizer output is generated to give the resultant speech more natural rhythmic content and intonation.

In the typical speech synthesizer, prosody information affects the pitch contours and/or duration values of the sounds being generated in response to text input. In natural speech, stressed or accented syllables are produced by raising the pitch of one's voice and/or by increasing the duration of the vowel portion of the accented syllable. By performing these same operations, the text-to-speech synthesizer can mimic the prosody of human speech. We have developed a template-based system to organize and associate prosody information with a sequence of text, where the text is described in terms of some sort of linguistic unit, such as a word or phrase. In our template-based system, a library of templates is constructed for a collection of words or phrases that have different phonological characteristics. Then, given particular text input, the template with the best matching characteristics is selected and used to supply prosodic information for synthesis.

When only a small number of words or phrases needs to be spoken, it is feasible to construct templates for each and every possible word or phrase that may be generated by the synthesizer. However, as the size of the spoken domain increases, it becomes increasingly costly to store all of the required templates.

The present invention provides a solution to this problem by a technique that finds the closest matching template for a given target synthesis and by then finding an optimal mapping between a not-exactly-matching template and target. The system is capable of generating new templates using portions of existing templates when an exactly matching template is not found.

For a more complete understanding of the invention, its objects and advantages, refer to the following specification and to the accompanying drawings.

DESCRIPTION OF THE PREFERRED EMBODIMENTS

Figure 1:
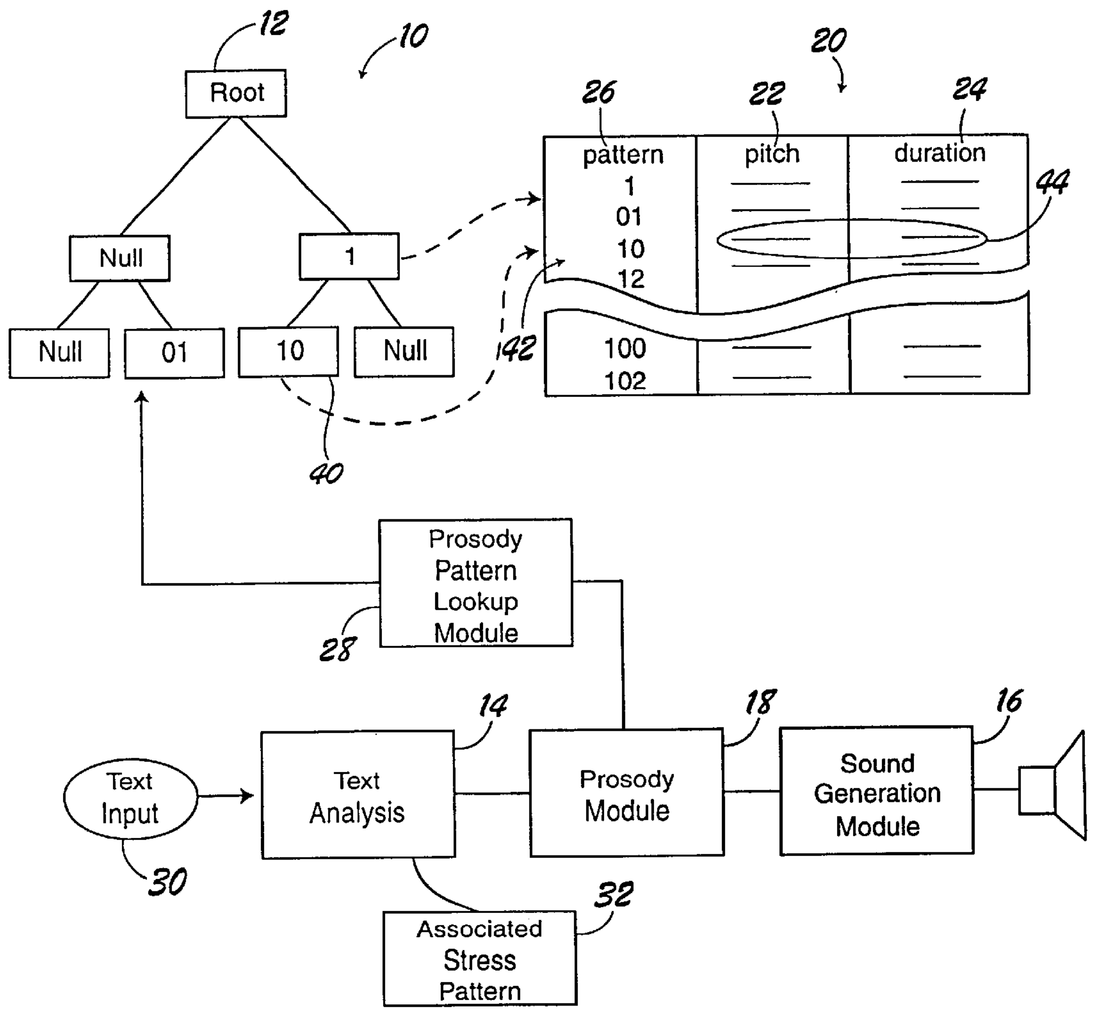
FIG. 1 is a data structure diagram illustrating the presently preferred prosody template matching data structures.
Figure 2:
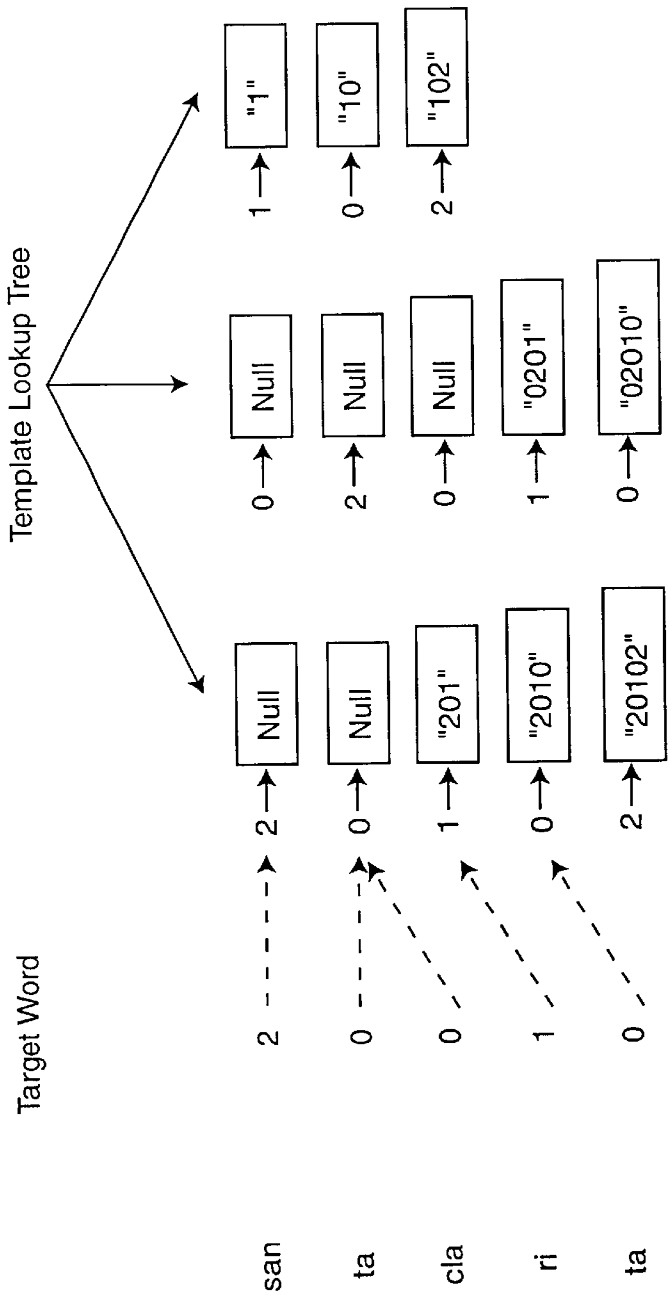
FIG. 2 is a chart showing how stress patterns for words are transcribed and represented in the preferred embodiment.

Referring to FIGS. 1 and 2, the prosody template matching system of the invention represents stress patterns in words in a tree structure, such as tree 10. The presently preferred tree structure is a binary tree structure having a root node 12 under which our grouped pairs of child nodes, grandchildren nodes, etc. The nodes represent different stress patterns corresponding to how syllables are stressed or accented when the word or phrase is spoken.

Referring to FIG. 2, an exemplary list of words is shown, together with the corresponding stress pattern for each word and its prosodic transcription. For example, the word "Catalina" has its strongest accent on the third syllable, with an additional secondary accent on the first syllable. For illustration purposes, numbers have been used to designate different levels of stress applied to syllables, where "0" corresponds to an unstressed syllable, "1" corresponds to a strongly accented syllable and "2" corresponds to a less strongly stressed syllable. While numeric representations are used to denote different stress levels here, it will be understood that other representations can also be used to practice the invention. Also, while the description here focuses primarily on the accent or stress applied to a syllable, other prosodic features may also be represented using the same techniques as described here.

Referring to FIG. 1, the tree 10 serves as a component within the prosody pattern lookup mechanism by which stress patterns are applied to the output of the text-to-speech synthesizer 14. Text is input to the text analysis module 14 which determines strings of data that are ultimately fed to the sound generation module 16. Part of this data found during text analysis is the grouping of sounds by syllable, and the assignment of stress level to each syllable. It is this pattern of stress assignments by syllable which will be used to access prosodic information by the prosody module 18. As discussed previously, prosodic modifications such as changing the pitch contour and/or duration of phonemes, are needed to simulate the manner in which a human speaker would pronounce the word or phrase in context. The text-to-speech synthesizer and its associated playback module and prosody module can be based on any of a variety of different synthesis techniques, including concatenative synthesis and model-based synthesis (e.g., glottal source model synthesis).

Figure 3:
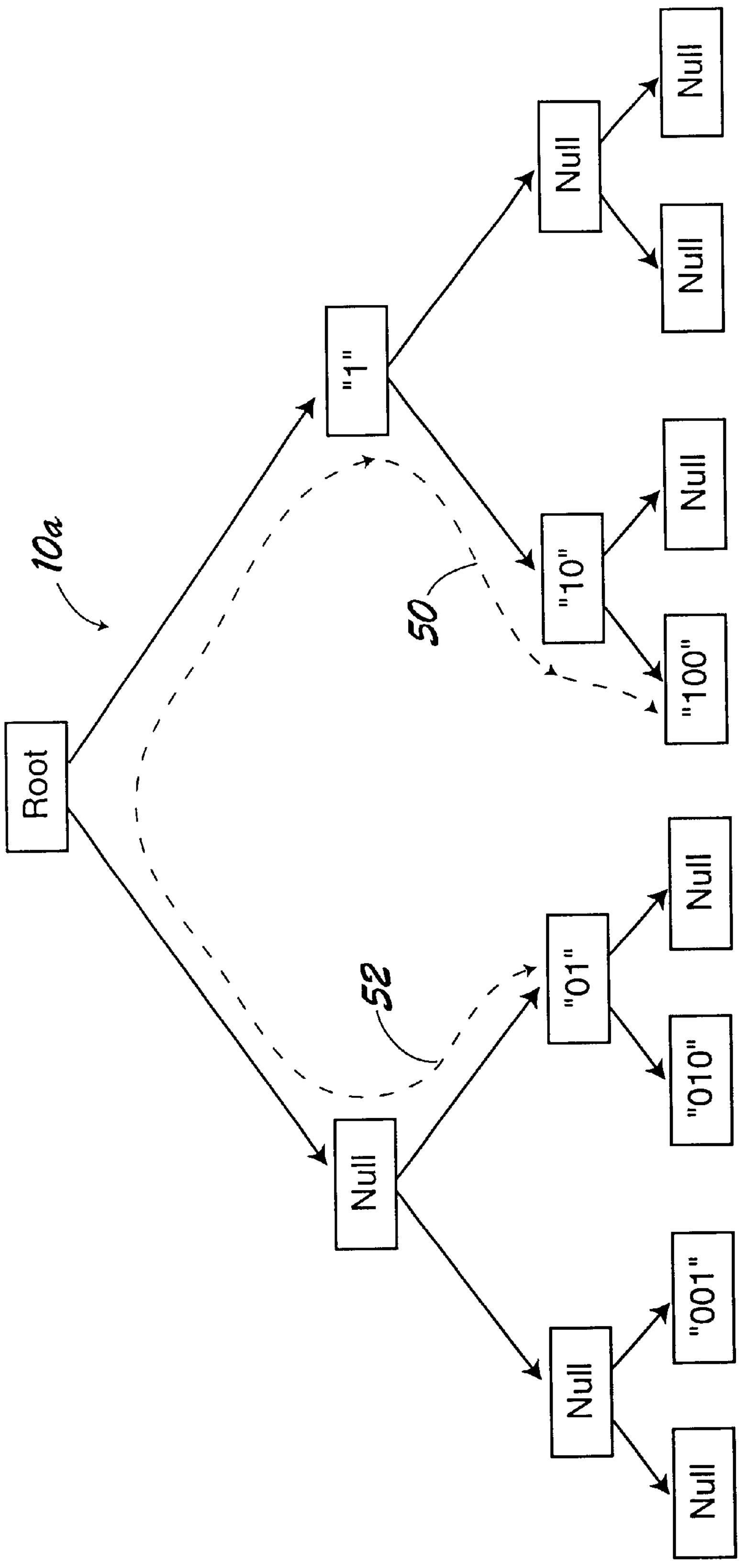
FIG. 3 is an exemplary template lookup tree showing how words with two levels of stress would be represented.
Figure 4:
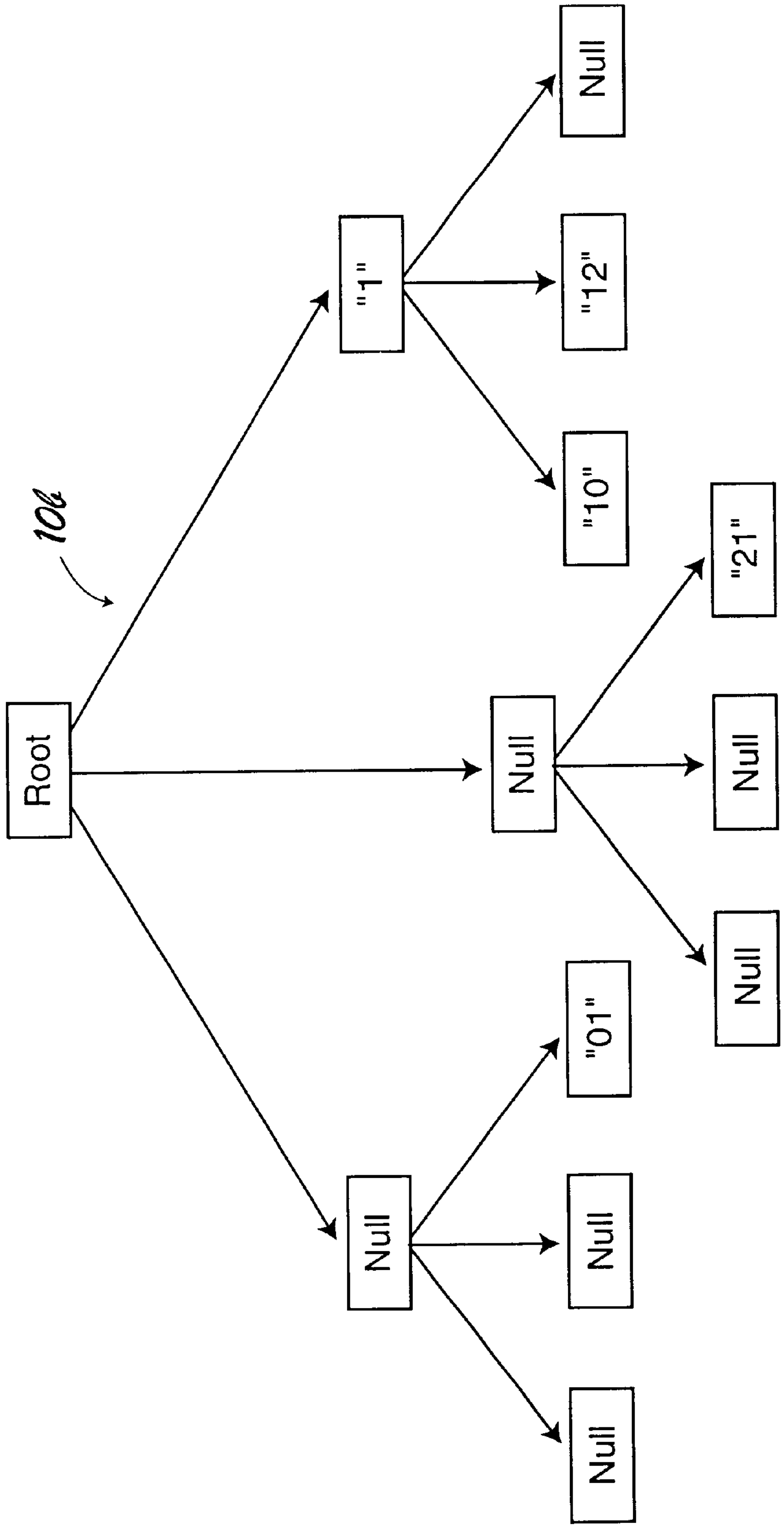
FIG. 4 is a similar template lookup tree showing how words having three levels of stress would be represented.

The prosody module modifies the data string output from the text-to-speech synthesizer 14 based on prosody information stored in a lookup table 20. In the illustrated embodiment, table 20 contains both pitch modification information (in column 22), and duration modifying information, in column 24. Of course, other types of prosody information can be used instead, depending on the type of text-to-speech synthesizer being used. The table 20 contains prosody information (pitch and duration) for each of a variety of different stress patterns, shown in column 26. For example, the pitch modification information might comprise a list of integer or floating point numbers used to adjust the height and evolution in time of the pitch being used by the synthesizer. Different adjustment values may be used to reflect whether the speaker is male or female. Similarly, duration information may comprise integer or floating point numeric values indicating how much to extend the playback duration of selected sounds (typically the vowel sounds). The prosody pattern lookup module 28 associated with prosody module 18 accesses tree 10 to obtain pointers into table 20 and then retrieves the pitch and duration information for the corresponding pattern so that it may be used by prosody module 18. It should be appreciated that the tree 10 illustrated in FIG. 1 has been greatly abbreviated to allow it to fit on the page. In an actual embodiment, the tree 10 and its associated table 20 would typically contain more nodes and more entries in the table. In this regard, FIG. 3 shows the first three levels of an exemplary tree 10*a* that might be typical of a template system allowing for two levels of stress (stressed and unstressed) while FIG. 4 shows the first two levels of an exemplary tree 10*b* illustrative of how a template lookup system might be implemented where three levels of stress are allowed (unstressed, primary stress, secondary stress). As the number of levels in the tree correspond to the maximum number of syllables in the associated prosody template, in practice trees of eight or more levels may be required.

In both tables 10*a* (FIG. 3) and 10*b* (FIG. 4) note that a number of the nodes have been identified as "null". Other nodes contain stress pattern integers corresponding to particular combinations of stress patterns. In the general case, it would be possible to populate each of the nodes with a stress pattern; thus none of the nodes would be null. However, in an actual working system, there may be many instances where there are no training examples available for certain stress pattern combinations. Where there are no data available, the corresponding nodes in the tree are simply loaded with a null value, so that the tree can be traversed from parent to child, or vice versa, even though there may be no template data available for that node in table 20. In other words, the null nodes serve as placeholders to retain the topological structure of the tree even though there are no stress patterns available for those nodes.

Referring to FIG. 1, it should now be apparent how the tree structure is used to access table 20. The text input 30 has an associated syllable stress pattern 32 which is determined by the text analysis module 14. In the illustrated embodiment, these associated syllable stress patterns would be represented as numeric stress patterns corresponding to the numeric values found in tree 10.

If the text input happens to be a two syllable word having a primary accent on the first syllable and no stress on the second syllable (e.g., 10), then the prosody pattern lookup module 28 will traverse tree 10 until it finds node 40 containing pattern "10". Node 40 stores the stress pattern "10" that corresponds to a two syllable word having its first syllable stressed and its second syllable unstressed. From there, the pattern lookup module 28 accesses table 20, as at row 42, to obtain the corresponding pitch and duration information for the "10" pattern. This pitch and duration information, shown at 44, is then supplied to prosody module 18 where it is used to modify the data string from synthesizer 14 so that the initial syllable will be stressed and the second syllable will be unstressed.

While it is possible to build a tree structure and corresponding table that contains all possible combinations of every stress pattern that will be encountered by the system, there are many instances where this is not practical or feasible. In some instances, there will be inadequate training data, such that some stress pattern combinations will not be present. In other applications, where memory resources are at a premium, the system designer may elect to truncate or depopulate certain nodes to reduce the size of the tree and its associated lookup table. The present invention is designed to handle these situations by generating a new or substitute prosody template on the fly. The system does this, as will be more fully explained below, by matching the input text stress pattern to one or more patterns that do exist in the tree and then adding or cloning additional stress pattern values, as needed, to allow existing partial patterns to be concatenated to form the desired new pattern.

The prosody pattern lookup module 28 handles situations where the complete prosody template for a given word does not exist in its entirety within the tree 10 and its associated table 20. The module does this by traversing or walking the tree 10, beginning at root node 12 and then following each of the branches down through each of the extremities. As the module proceeds from node to node, it tests at each step whether the stress pattern stored in the present node matches the stress pattern of the corresponding syllable within the word.

Each time the stress pattern value stored within a node does not match the stress value of the corresponding syllable within the target word, the lookup module adds a predetermined penalty to a running total being maintained for each of the paths being traversed. The path with the lowest penalty score is the one that best matches the stress pattern of the target word. In the preferred embodiment penalty scores are selected from a stored matrix of penalty values associated with different combinations of template syllable stress and target syllable stress. In addition, these pre-stored penalties may be further modified based on the context of the target word within the sentence or phrase being spoken. Contexts that are perceptually salient have penalty modifiers associated with them. For example, in spoken English, a prosody mismatch in word-final syllables is quite noticeable.

Thus, the system increases the penalty selected from the penalty matrix for mismatches that occur in word-final syllables.

A search is performed to match syllables in the target word to syllables in the reference template that minimizes the mismatch penalty. Conceptually the search enumerates all possible assignments of target word syllables to reference template syllables. In fact, it is not necessary to enumerate all possible assignments because, in the process of searching it is possible to know that some sequence of syllable matches cannot possibly compete with another and can therefore be abandoned. In particular, if the mismatch penalty for a partial match exceeds the lowest mismatch penalty for a full match which has already been found, then the partial match can safely be abandoned.

To understand the concept by which the penalties are applied, refer to FIG. 3. The tree structure of FIG. 3 can be traversed from the root node through various paths to each of the eight leaf nodes appearing at the bottom of the tree. One such path is illustrated in dotted lines at 50. Other paths may be traced from the root node to intermediate nodes, such as path 52. Path 50 ends at the node containing pattern "100" while path 52 ends at the node containing pattern "01". Path 52 could also be extended to define an additional path ending at the node containing "010" as well. As the prosody pattern lookup module 28 explores each of the possible paths, it accumulates a penalty score for each path. When attempting to match the stress pattern "01" of a target word supplied as input text, path 52 would have a zero penalty score, whereas all other paths would have higher penalty scores, because they do not exactly match the stress pattern of the target word. Thus, the lookup module would identify path 52 as the least-cost path and would then identify the node containing "01" as the proper node for use as an index into the prosody look-up table 20 (FIG. 1). All other paths, having higher penalty scores, would be rejected.

Figure 5:
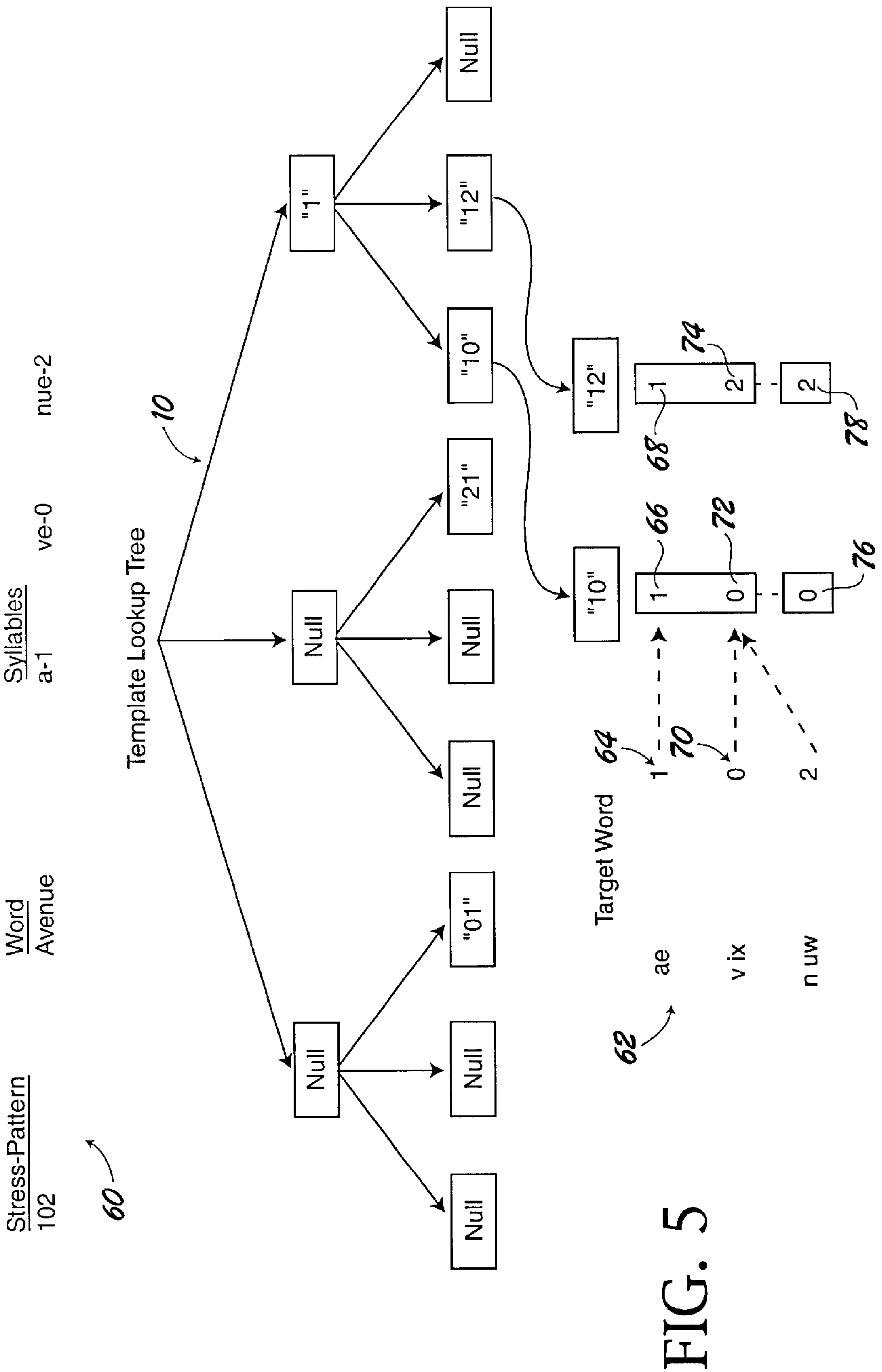
FIG. 5 is a template-matching diagram showing how an exemplary word "avenue" would be processed using the invention.

As noted above, there are instances where a perfect match will not be found by traversing any of the paths through the tree. The prosody pattern lookup module 28 addresses this situation by a node construction technique. FIG. 5 gives a simple example of how the technique is applied.

Referring to FIG. 5, the target word "avenue" has a stress pattern of "102" as indicated by the dictionary information at 60. Thus the prosody pattern lookup module would ideally like to find the node containing stress pattern "102" in the tree 10. In this case, however, the stress pattern "102" is not found in tree 10. The prosody pattern lookup module 28 seeks a three-syllable stress pattern within a tree structure that contains only two syllable stress patterns. There are, however, nodes containing "10" and "12" that may serve as an approximation of the desired pattern "102". Thus, the module generates an additional stress pattern by duplicating or cloning one of the nodes on a tree so that one syllable of a template can be used for two or more adjacent syllables of the target word.

In FIG. 5, the target word "avenue" is shown broken up into syllables at 62. Two nodes, namely the node containing "10" and the node containing "12" match the stress pattern of the first syllable of the target word. In FIG. 5, note that the stress pattern of the first syllable of the target word, shown at 64, matches the beginning stress pattern of nodes "10" and "12", as shown at 66 and 68, respectively. The stress pattern of the middle syllable of the target word, shown at 70, matches the second syllable of the "10" node, as shown at 72. It does not match the second syllable of node "12" as shown at 74. However, because the lookup tree 10 contains only one and two syllable nodes, a third syllable must be generated. The preferred embodiment does this by cloning or duplicating the stress pattern of an adjacent syllable. Thus an additional "0" stress pattern is added at 76 and an additional "2" stress pattern is added at 78. Both of the resulting paths (including the added or cloned syllables) are evaluated using the matrix of penalties. The cumulative scores of both are assessed and the solution with the lowest penalty score is selected.

The preferred embodiment calculates the penalty by finding an initial penalty value in a lookup table. An exemplary lookup table is provided as follows:

TABLE I

| Input Syllable Stress | Template Syllable Stress 0 | 1 | 2 |
|---|---|---|---|
| 0 | 0 | 16 | 2 |
| 1 | 16 | 0 | 4 |
| 2 | 2 | 4 | 0 |

This initial value is then modified to account for context effects by applying the following modification rules:

| | |
|---|---|
| Rule 1 | if the template syllable is constructed by repeating the previous syllable, add 4 to the penalty value. |
| Rule 2 | if the previous input syllable has stress level of 1 or 2, add 4 to the penalty value. |
| Rule 3 | if the succeeding input syllable has stress level of 1 or 2, add 4 to the penalty value. |
| Rule 4 | if the mismatch syllable is the final one in the word, multiply the cumulative penalty by 16. |

While the above context modification rules are based on prosodic features of the target word, it is readily understood other phonetic features associated with the target word or phrase may also be used as the basis for context modification rules.

In the illustrated example, the first generated solution "100" matches the target word "102" exactly, except for the final syllable. Because a substitution has occurred whereby a desired "2" is replaced with "0" an initial penalty of two is accrued (see matrix of penalties in Table I). In addition, the context modification rules are applied to the first generated solution. In this case, the initial penalty is incremented by 4 in accordance with Rule 1 and then multiplied by 16 in accordance with rule 4 to yield a penalty score of ((2+4)*16=) 96.

By a similar analysis, the second solution "122" matches the target word "102" exactly, except for the substitution of a "2" for the "0" in the second syllable. A substitution of "2" for "0" also accrues a penalty of two. In addition, the initial penalty is incremented by 12 in accordance with Rules 1, 2 and 3 to yield a penalty score of (2+4+4+4=) 14. Thus, the second generated solution "122" has the lower cumulative penalty score and is selected as the stress pattern most closely correlated to the target word. In the event that solutions carry the same cumulative penalty score, the prosody pattern lookup module can contain a set of rules designed to break ties. For instance, successive unstressed syllables are favored over successive intermediate stressed syllables when selecting a solution. Pseudo-code implementing this preferred embodiment has been attached hereto as an Appendix.

Continuing with the example illustrated in FIG. 5, the prosody pattern lookup module would use the pattern "10"

to access the table and retrieve the pitch and duration information for that pattern. It would then repeat the pitch and duration information from the second syllable in the "10" pattern for use in the third syllable of the constructed "102" pattern. The retrieved prosody data would then be joined or concatenated and fed to the prosody module 18 (FIG. 1) for use in modifying the string data sent from synthesizer 14.

Figure 6:
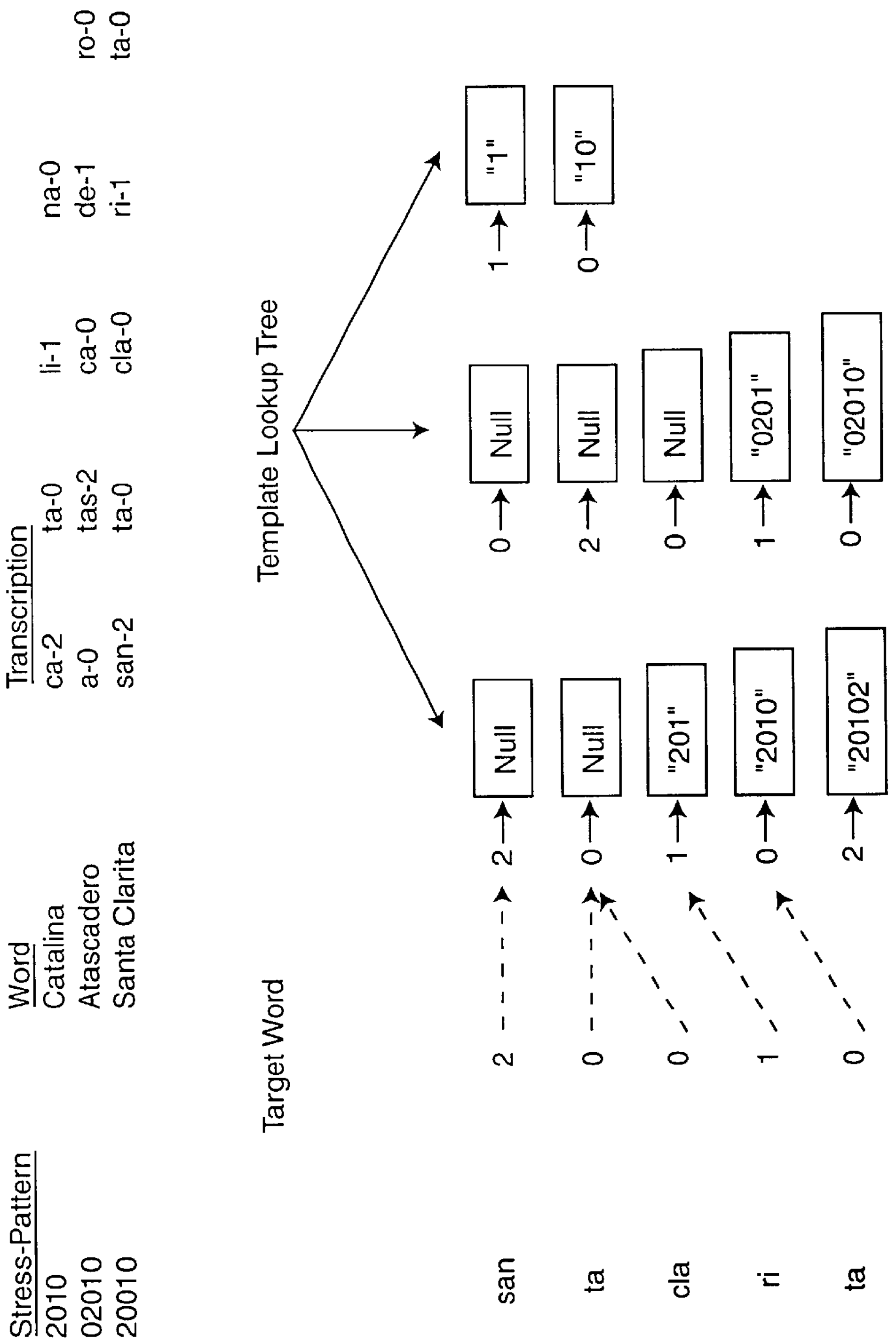
FIG. 6 is a template matching diagram illustrating how the exemplary words "Santa Clarita" would be processed using the invention.

A somewhat more complex example, shown in FIG. 6, will further illustrate the technique by which the lookup module handles inexact matches. The example of FIG. 6 uses the target words "Santa Clarita". The desired stress pattern of the target word is "20010". The template lookup tree has the three-part branching structure of tree 10*b* in FIG. 4, but extends to more levels to include patterns of up to five syllables. A few of the relevant branches of the tree are shown schematically in FIG. 6.

To summarize what has been shown by the preceding examples, the preferred lookup algorithm descends the template lookup tree, attempting to match syllable stress levels of the target word. The match need not be exact. Rather, a measure of closeness is maintained by summing the values found from the penalty matrix, as modified by the context-sensitive penalty modification rules. As different branches of the tree are explored, paths do not need to be pursued completely, if the cumulative penalty score for that partially traversed branch surpasses that of the best branch found thus far. The system will insert nodes by cloning or duplicating an existing node to allow one syllable of a template to be used for two or more adjacent syllables of the target word. Naturally, because adding a cloned syllable corresponds to a template/target mismatch, the action of adding a syllable incurs a penalty which is summed with the other accumulated penalties attributed to that branch.

As the algorithm proceeds to match nodes in the tree with target syllables, a record is maintained as to which template syllable matched each target syllable. Later, when the text-to-speech synthesizer is employed, the prosodic features of the recorded template syllable are applied to the data corresponding to that syllable from the target word. If the descent through a path resulted in a node being cloned, then the corresponding template syllable's prosodic information is used for both or all of the target syllables which the descent algorithm matched to it. In terms of pitch information this means that the template syllable's contour should be stretched over the duration of both target syllables. In terms of duration information, both target syllables should be assigned duration values according to the relative duration value of the template syllable.

The examples illustrated so far have focused on the use of a single tree. The invention can be extended to use multiple trees, each being utilized in a different context. For example, the input text supplied to the synthesizer can be analyzed or parsed to identify whether a particular word is at the beginning, middle or end of the sentence or phrase. Different prosodic rules may wish to be applied depending on where the word appears in the phrase or sentence. To accommodate this, the system may employ multiple trees each having an associated lookup table containing the pitch and duration information for that context. Thus, if the system is processing a word at the beginning of the sentence, the tree designated for use by beginning words would be used. If the word falls in the middle or at the end of the sentence, the corresponding other trees would be used. It will, of course, be recognized that such a multiple tree system could be implemented as a single large tree in which the beginning, middle and end starting points would be the first three child nodes from a single root node.

The algorithm has been described herein as progressing from the first syllable of the target word to the final syllable of the target word in "left-to-right" order. However, if the data in the template lookup trees are suitably re-ordered, the algorithm could be applied as well progressing from the final syllable of the target word to the first syllable of the target word in "right-to-left" order.

From the foregoing it will be appreciated that the present invention may be used to select prosody templates for speech synthesis in a variety of different applications. While the invention has been described in its presently preferred embodiments, modifications can be made to the foregoing without departing from the spirit of the invention as set forth in the appended claims.

APPENDIX

```
CALLING ROUTINE:
ThisNode = RootNode
ThisTargetSyllable = StartSyllable
ThisStress = UNASSIGNED_STRESS
ThisPenalty = 0
BestPenalty = LARGE_VALUE
ProsodyTemplate = UNASSIGNED_PRODODY_TEMPLATE
Status = Match (This Node, ThisTargetSyllable, ThisStress, ThisPenalty, BestPenalty, ProsodyTemplate)
If (Status is TRUE)
{
    for each Syllable in the word or phrase
    {
    Lookup Pitch and Duration information from ProsodyTemplate
    Set Pitch and Duration output values
    }
}
else
{
    Set Default Pitch and Duration output values
}
SUB-ROUTINE Match (a recursive procedure which returns a TRUE or FALSE value, and resets the
ProsodyTemplate):
Match (ThisNode, ThisTargetSyllable, ThisStress, ThisPenalty, BestPenalty, ProsodyTemplate)
{
    ThisBranchIsBestSoFar = FALSE
/* ABANDON THIS PATH IF IT'S PENALTY IS ALREADY GREATER OR EQUAL TO THE */
/* PENALTY OF THE BEST-SO-FAR COMPLETE PATH */
```

APPENDIX-continued

```
if (ThisPenalty is greater or equal to BestPenalty)
{
    return FALSE
}
/* CHECK IF WE HAVE COMPLETED THE WORD OR PHRASE */
if (ThisTargetSyllable is the LastSyllable)
{
    /* WE HAVE COMPLETED THE WORD OR PHRASE. */
    /* CHECK IF THIS NODE HAS A TEMPLATE */
    if (the ProsodyTemplate of ThisNode is not NULL)
{
    /* THIS NODE HAS A TEMPLATE. THAT TEMPLATE IS BEST-SO-FAR */
    BestPenalty = ThisPenalty
    ProsodyTemplate = the ProsodyTemplate of ThisNode
    Return TRUE
}
else
{
    /* THIS NODE HAS NO TEMPLATE. THIS PATH HAS FAILED */
    return FALSE
}
}
else
{
    /* WE HAVE NOT COMPLETED THE WORD OR PHRASE. */
    /* TRY ALL BRANCHES EXTENDING FROM THIS NODE */
  for each NewNode which is a child of ThisNode
{
    /* COMPUTE THE ADDITIONAL PENALTY FOR THIS MATCH */
    AdditionalPenalty = Value from Table 1
    /* APPLY RULE 4 */
    if (ThisTargetSyllable is last syllable in target word)
{
    AdditionalPenalty = AdditionalPenalty * 16
}
/* APPLY MATCH FUNCTION RECURSIVELY TO THE CHILD NODE. */
NewPenalty = ThisPenalty + AdditionalPenalty
NewTargetSyllable = next syllable after ThisTargetSyllable
NewStress = stress of the new syllable in this NewNode
Status = Match (NewNode, NewTargetSyllable, NewStress, NewPenalty, BestPenalty, ProsodyTemplate)
/* IF MATCH FUNCTION RETURNED "TRUE" STATUS, A BEST-SO-FAR PATH WAS FOUND; */
/* RECORD THIS AND THE FACT THAT WE DID NOT REPEAT A TEMPLATE SYLLABLE AT THIS
POINT */
IF (Status is TRUE)
{
    ThisBranchIsBestSoFar = TRUE
  Mark ThisTargetSyllable as NOT__REQUIRING__REPEATED__TEMPLATE__SYLLABLE */
  }
}
  /* DETERMINE IF THIS NODE OF THE TEMPLATE TREE MAY BE REPEATED: */
if ( (ThisStress is UNASSIGNED__STRESS) OR (ThisTargetSyllable is LastSyllable) )
{
    /* CANNOT REPEAT THE ROOT NODE, AND CANNOT REPEAT A NODE ON THE LAST
SYLLABLE */
return ThisBranchIsBestSoFar
}
else
{
    /* TRY REPEATING THIS NODE FOR THE TEMPLATE TREE. */
    /* COMPUTE THE ADDITIONAL PENALTY FOR THIS MATCH */
    AdditionalPenalty = Value from Table 1
    /* APPLY RULE 1 */
    AdditionalPenalty = AdditionalPenalty + 4
    /* APPLY RULE 2 */
    if (previous syllable stress is 1 or 2)
{
  AdditionalPenalty = AdditionalPenalty + 4
}
/* APPLY RULE 3 */
if (next syllable stress is 1 or 2)
{
  AdditionalPenalty = AdditionalPenalty + 4
}
/* APPLY RULE 4 */
if (ThisTargetSyllable is last syllable in target word)
{
    AdditionalPenalty = AdditionalPenalty * 16
}
/* APPLY MATCH FUNCTION RECURSIVELY TO THE REPEATED NODE. */
```

APPENDIX-continued

```
NewPenalty = ThisPenalty + AdditionalPenalty
NewTargetSyllable = next syllable after ThisTargetSyllable
Status = Match (ThisNode, NewTargetSyllable, ThisStress, NewPenalty, BestPenalty, ProsodyTemplate)
    /* IF MATCH FUNCTION RETURNED "TRUE" STATUS, A BEST-SO-FAR PATH WAS FOUND;
*/
    /* RECORD THIS AND THE FACT THAT WE REPEATED A TEMPLATE SYLLABLE AT THIS
    POINT
*/
    if (Status is TRUE)
    {
    ThisBranchIsBestSoFar = TRUE
    Mark ThisTargetSyllable as REQUIRING_REPEATED_TEMPLATE-SYLLABLE
      }
    }
    }
    /* RETURN STATUS SIGNALLING IF BEST-SO-FAR PATH WAS FOUND HERE */
    return ThisBranchIsBestSoFar
}
```

What is claimed is:

1. A text-to-speech synthesizer system, comprising:

a text input module receptive of target synthesis text;

a prosody module connected to the text input module for associating prosody information with the target synthesis text, the prosody module employing an n-way tree structure of plural traversal paths to identify the prosody information for the target synthesis text;

the prosody module having a prosody pattern lookup module that traverses said tree structure, the lookup module having a stored matrix of penalty values associated with said plural traversal oaths and being operative to identify the prosody information for the target synthesis text corresponding to the traversal path of lowest penalty value; and a sound generation module connected to the prosody module for converting the target synthesis text to audible speech using the prosody information.

2. The text-to-speech synthesizer system of claim 1 wherein the prosody module employs a tree structure that is based on stress patterns, such that each node of the tree structure corresponds to a stress level that may be associated with a syllabic portion of a text string.

3. The text-to-speech synthesizer system of claim 2 wherein the text input module is operative to segment the target synthesis text into syllabic portions and to determine a stress level for each syllabic portion, thereby forming a stress pattern for the target synthesis text.

4. The text-to-speech synthesizer system of claim 3 wherein the prosody module is operative to traverse the tree structure in order to identify a matching stress pattern that corresponds to the stress pattern for the target synthesis text and to retrieve the prosody information for the target synthesis text using the matching stress pattern.

5. The text-to-speech synthesizer system of claim 1 wherein the prosody information is further defined as pitch modification information and duration modification information.

6. A method for generating synthesized speech, comprising the steps of:

receiving an input text string;

employing an n-way tree structure to identify prosody information for the input text string, where the tree structure is based on stress patterns such that each node of the tree structure provides a stress level that may be associated with a syllabic portion of a text string;

the prosody module having a prosody pattern lookup module that traverses said tree structure, the lookup module having a stored matrix of penalty values associated with said plural traversal paths and being operative to identify the prosody information for the target synthesis text corresponding to the traversal Path of lowest penalty value; and converting the input text string into audible speech using the prosody information.

7. The method of claim 6 further comprising the steps of:

segmenting the input text string into syllabic portions;

determining a stress level for each syllabic portion of the input text string, thereby forming a stress pattern for the input text string;

traversing the tree structure in order to identify a matching stress pattern that matches the stress pattern for the input text string; and using the matching stress pattern to retrieve the prosody information for the input text string.

8. The method of claim 7 wherein the step of traversing the tree structure further comprises the steps of:

comparing a stress level for a syllabic portion of the input text string with a stress level for the corresponding syllabic portion in the tree structure;

determining a matching score indicative of the correlation between the stress level for the syllabic portion of the input text string and the stress level for the corresponding syllabic portion in the tree structure; and using the matching score to identify a matching stress pattern that correlates to the stress pattern for the input text string.

9. The method of claim 8 wherein the step of determining a matching score further comprises modifying the matching score based on at least one of the context of the syllabic portion within a transcription derived from the input text string and the context of a word within the input text string, where the word incorporates the syllabic portion used to determine the matching score.

10. The method of claim 8 further comprises the steps of:

accumulating a matching score for each path that is traversed in the tree structure;

storing a stress pattern having the lowest matching score;

updating the stress pattern having the lowest matching score when the matching score for a given path is less than or equal to the lowest matching score; and ceasing to traverse a path in the tree structure when the matching score for the given path exceeds the lowest matching score.

11. The method of claim 7 wherein the step of traversing the tree structure further comprises the step of constructing a stress pattern that correlates to the stress pattern of the input text string, when a matching stress pattern is not identified in the tree structure.

12. The method of claim 11 wherein the step of constructing a stress pattern further comprises the steps of:

identifying one or more target nodes having stress patterns that correlate to the stress pattern of the input text string;

cloning a stress level from an adjacent syllabic portion in the target node, when the number of syllabic portions in the target node is less than the number of syllabic portions in the input text string; and concatenating the stress level onto the stress pattern of the target node, thereby constructing a stress pattern that correlates to the stress pattern of the input text string.

13. The method of claim 12 wherein the step of constructing a stress pattern further comprises the steps of:

determining a matching score indicative of the correlation between the stress patterns for each of the target nodes and the stress pattern of the input text string; and using the matching score to identify a target node that most closely correlates to the stress pattern of the input text string.

14. The method of claim 13 further comprising the steps of:

retrieving the prosody information for the identified target node;

cloning a portion of the prosody information that corresponds to the cloned adjacent syllabic portion of the target node; and concatenating the portion of the prosody information onto the remainder of the prosody information, thereby constructing the prosody information that corresponds to the identified target node.

15. The method of claim 14 further comprising the step of converting the input text string to audible speech using the prosody information that corresponds to the identified target node.

16. The method of claim 6 wherein the prosody information is further defined as pitch modification information and duration modification information.

17. A method for generating prosody information for use in a text-to-speech synthesizer system, comprising the steps of:

receiving an input text string;

determining a pattern of prosodic features associated with the input text string;

identifying a first prosody template from a plurality of prosody templates by traversing an n-way tree structure in order to identify a matching pattern of prosodic features, where the tree structure is based on stress patterns and has plural nodes such that each node provides a stress level that may be associated with a syllabic portion of a text string, and where each prosody template represents a pattern of prosodic features that may be associated with a text string and the first prosody template having a pattern of prosodic features that correlate to the input text string;

cloning a portion of the first prosody template by cloning one of said nodes, when the pattern for the first prosody template is shorter than the pattern for the input text string; and concatenating the replicated portion of the first prosody template onto the pattern of the first prosody template, thereby constructing a generated prosody template that more closely correlates to the input text string.

18. The method of claim 17 further comprising the steps of using the generated prosody template to retrieve prosody information for the input text string, and converting the input text string into audible speech using the prosody information.

19. The method of claim 17 wherein each prosody template is further defined as a pattern of stress levels for each syllabic portion of a text string.

20. The method of claim 17 wherein the step of determining a pattern of prosodic features further comprises the steps of:

segmenting the input text string into syllabic portions; and determining a stress level for each syllabic portion of the input text string, thereby forming a stress pattern for the input text string.

21. The method of claim 17 wherein the step of cloning a portion of the first prosody template further comprises the steps of cloning a stress level from an adjacent syllabic portion of the matching pattern, when the number of syllabic portions in the first prosody template is less than the number of syllabic portions of the stress pattern for the input text string, and concatenating the stress level onto the matching pattern of the first prosody template.

22. The system of claim 1 wherein the target synthesis text is arranged as target words with an associated context and wherein said prosody pattern lookup module includes a system for determining the associated context of a target word and for modifying at least one penalty value associated with said target word.

* * * * *

UNITED STATES PATENT AND TRADEMARK OFFICE

CERTIFICATE OF CORRECTION

PATENT NO. : 6,845,358 B2
DATED : January 18, 2005
INVENTOR(S) : Nicholas Kibre and Ted H. Applebaum It is certified that error appears in the above-identified patent and that said Letters Patent is hereby corrected as shown below:

Title page,
Item [56], References Cited, OTHER PUBLICATIONS, "Chung-Hsien Wu, Jau-Hung Chen, "Template-Driven Generation of Prosodic Information for chinese Concatenative Synthesis", 1999 IEEE International Conference on Acoustics, Speech, adn signal Processing. Phoenix, AZ, Mar. 15-19, 1999, IEEE Internation Conference on Acoustics, Speech, and signal Processign (ICASSP), New York, NY" should be
-- Chung-Hsien Wu, Jau-Hung Chen, "Template-Driven Generation of Prosodic Information for Chinese Concatenative Synthesis", 1999 IEEE International Conference on Acoustics, Speech, and Signal Processing. Phoenix, AZ, Mar. 15-19, 1999, IEEE International Conference on Acoustics, Speech and Signal Processing (ICASSP), New York, NY. --

Signed and Sealed this

Twenty-eighth Day of June, 2005

JON W. DUDAS
*Director of the United States Patent and Trademark Office*